(12) United States Patent
Chan et al.

(10) Patent No.: US 8,930,900 B2
(45) Date of Patent: *Jan. 6, 2015

(54) ARTIFACT DIVIDER FOR LARGE SCALE APPLICATION BUILDS

(71) Applicant: International Business Machines Corporation, Armonk, NY (US)

(72) Inventors: Keith Chi-Hang Chan, Markham (CA); Yu Yuan, Toronto (CA)

(73) Assignee: International Business Machines Corporation, Armonk, NY (US)

(*) Notice: Subject to any disclaimer, the term of this patent is extended or adjusted under 35 U.S.C. 154(b) by 31 days.

This patent is subject to a terminal disclaimer.

(21) Appl. No.: 13/844,360

(22) Filed: Mar. 15, 2013

(65) Prior Publication Data

US 2014/0053141 A1 Feb. 20, 2014

Related U.S. Application Data

(63) Continuation of application No. 13/589,129, filed on Aug. 18, 2012.

(51) Int. Cl.
*G06F 9/44* (2006.01)
*G06F 9/445* (2006.01)
*G06F 9/45* (2006.01)

(52) U.S. Cl.
CPC .. *G06F 8/41* (2013.01); *G06F 8/54* (2013.01); *G06F 8/61* (2013.01)
USPC ............ 717/120; 717/101; 717/126; 717/174

(58) Field of Classification Search
USPC ......................................... 717/120
See application file for complete search history.

(56) References Cited

U.S. PATENT DOCUMENTS

| 7,562,346 B2 | 7/2009 | Jhanwar et al. |
| 8,010,946 B2 | 8/2011 | Zaky et al. |
| 2005/0262502 A1 | 11/2005 | Lari et al. |

(Continued)

OTHER PUBLICATIONS

Beyer, Dirk, et al., "Clustering Software Artifacts Based on Frequent Common Changes," IEEE, Proceedings of the 13th International Workshop on Program Comprehension, pp. 259-268, 2005.

(Continued)

*Primary Examiner* — Don Wong
*Assistant Examiner* — Marina Lee
(74) *Attorney, Agent, or Firm* — Nelson and Nelson; Daniel P. Nelson; Alexis V. Nelson

(57) ABSTRACT

A method for building an application installation repository is disclosed herein. In one embodiment a build directory comprising a plurality of application objects is evaluated. Artifact generation rules may also be evaluated with respect to the application objects and the build directory. Object groupings, each comprising one or more application objects of the plurality of application objects, are defined according to the evaluations of the artifact generation rules and the hierarchical directory structure and artifacts are generated according to the object groupings. An installable application is generated that includes the generated artifacts. Artifacts may be further grouped into sharable units and assemblies according to rules and organization of application objects in the build directory. A delta build including only artifacts corresponding to modified files and correspondingly modified metadata may also be generated according to methods disclosed herein. A corresponding computer program product is also disclosed.

9 Claims, 9 Drawing Sheets

(56) References Cited

U.S. PATENT DOCUMENTS

| | | | |
|---|---|---|---|
| 2006/0107218 A1* | 5/2006 | Clark et al. | 715/733 |
| 2006/0212857 A1 | 9/2006 | Neumann et al. | |
| 2007/0118730 A1* | 5/2007 | Platt | 713/2 |
| 2007/0220115 A1* | 9/2007 | Srinivasan et al. | 709/219 |
| 2009/0109225 A1 | 4/2009 | Srivastava et al. | |
| 2011/0246982 A1 | 10/2011 | Wookey | |
| 2011/0258605 A1* | 10/2011 | Ioannou et al. | 717/126 |
| 2013/0174124 A1* | 7/2013 | Watters et al. | 717/122 |
| 2014/0053141 A1* | 2/2014 | Chan et al. | 717/140 |
| 2014/0053148 A1* | 2/2014 | Chan et al. | 717/174 |

OTHER PUBLICATIONS

Ying, Pan, et al., "Software Artifacts Management Based on Dataspace," IEEE, WASE International Conference on Information Engineering, pp. 214-217, 2009.

\* cited by examiner

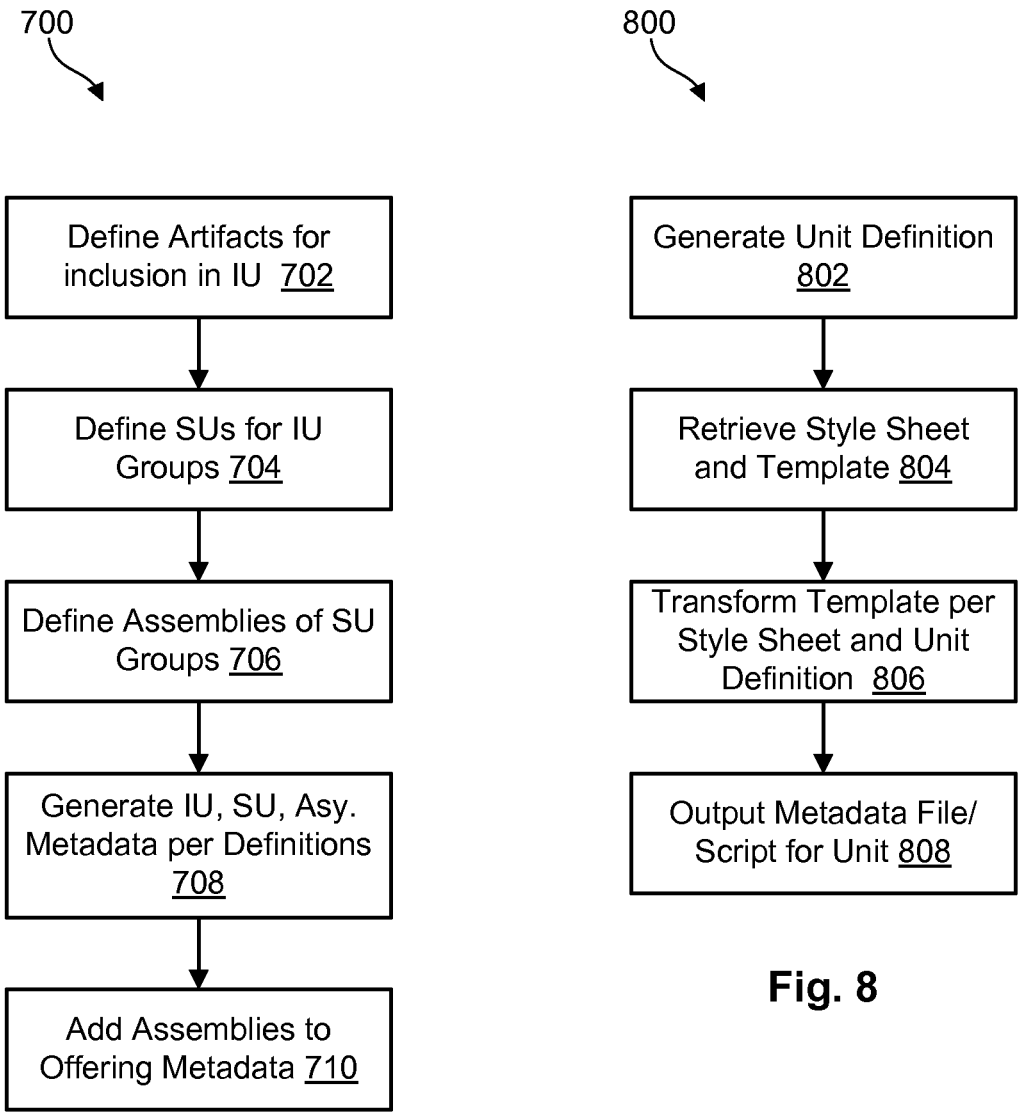

ARTIFACT DIVIDER FOR LARGE SCALE APPLICATION BUILDS

BACKGROUND

1. Field of the Invention

This invention relates to systems and methods for building applications from compiled objects and, more particularly, to systems and methods for generating an installable installation repository for an application.

2. Background of the Invention

Building an installation image for an installation utility, such as IBM Installation Manager, typically requires dividing files into logical groups (artifacts) and creating metadata to describe the artifacts, referred to as installable units (IUs). Although integrated development environments (IDE) often provide utilities or user interfaces to define such groupings, these tools typically require installation developers to manually create the artifacts and corresponding metadata, such as IUs and one or more higher level groupings, such as sharable units (SUs), assemblies, and offerings.

However, it is unfeasible to manually divide, for example, 300,000 files into 30,000 artifacts in a large-scale build. Generating an artifact for each file results, in this example, in 300,000 metadata files (IUs) for each file, which would make the final installation repository prohibitively large. Dividing the files into a smaller set of artifacts results in very large artifacts. This presents difficulty when preparing fix packages inasmuch as artifacts are often replaced as a unit. Any modifications to a file included in the artifact would require the entire artifact to be regenerated, distributed, and installed. Where the artifacts are very large this becomes a very cumbersome and resource intensive task.

In view of the foregoing, what are needed are methods to facilitate artifact generation for applications including a large number of files and to otherwise facilitate creation of an installable application for consumption by an installation manager.

SUMMARY

The invention has been developed in response to the present state of the art and, in particular, in response to the problems and needs in the art that have not yet been fully solved by currently available methods. Accordingly, the invention has been developed to provide methods to build an application installation repository. The features and advantages of the invention will become more fully apparent from the following description and appended claims, or may be learned by practice of the invention as set forth hereinafter.

Consistent with the foregoing, a method for building an application installation repository is disclosed herein. In one embodiment, such a method includes evaluating a build directory comprising a plurality of application objects in a hierarchical directory structure. Artifact generation rules may also be evaluated with respect to the application objects and the hierarchical directory structure. Object groupings, each comprising one or more application objects of the plurality of application objects, are defined according to the evaluations of the artifact generation rules and the hierarchical directory structure and artifacts are generated according to the object groupings. An installable application is generated that includes the generated artifacts.

A corresponding computer program product is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 is a process flow diagram of a method for defining a hierarchy of units in an installable application;

FIG. 8 is a process flow diagram of a method for generating a unit of an installable application;

DETAILED DESCRIPTION

Figure 1:
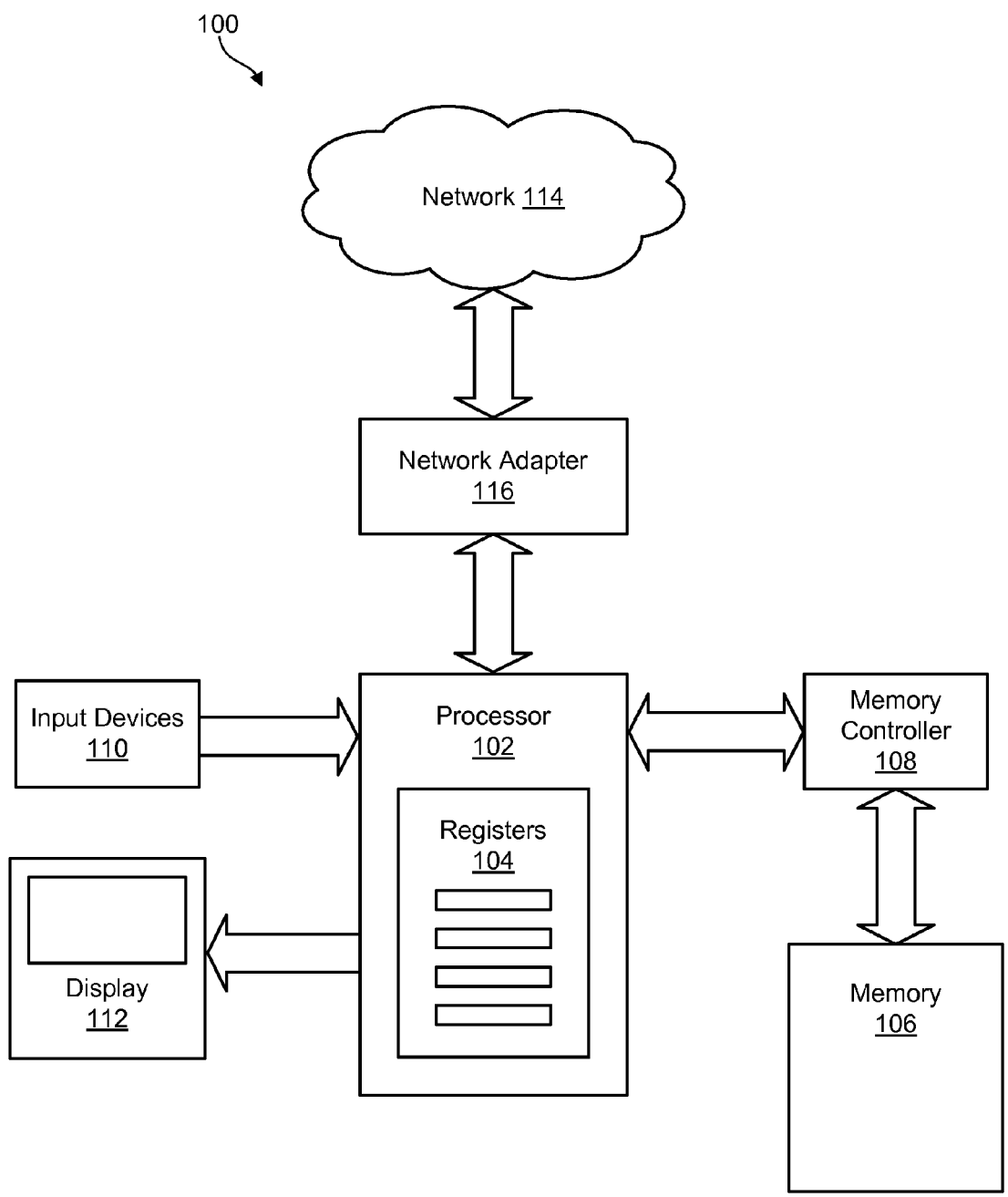
FIG. 1 is a high-level block diagram showing one example of a computer system suitable for use with various embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java™, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where techniques in accordance with the invention may be implemented. The computer system 100 is presented only by way of example and is not intended to be limiting. Indeed, the techniques disclosed herein may be applicable to a wide variety of different computer systems in addition to the computer system 100 shown. The techniques disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
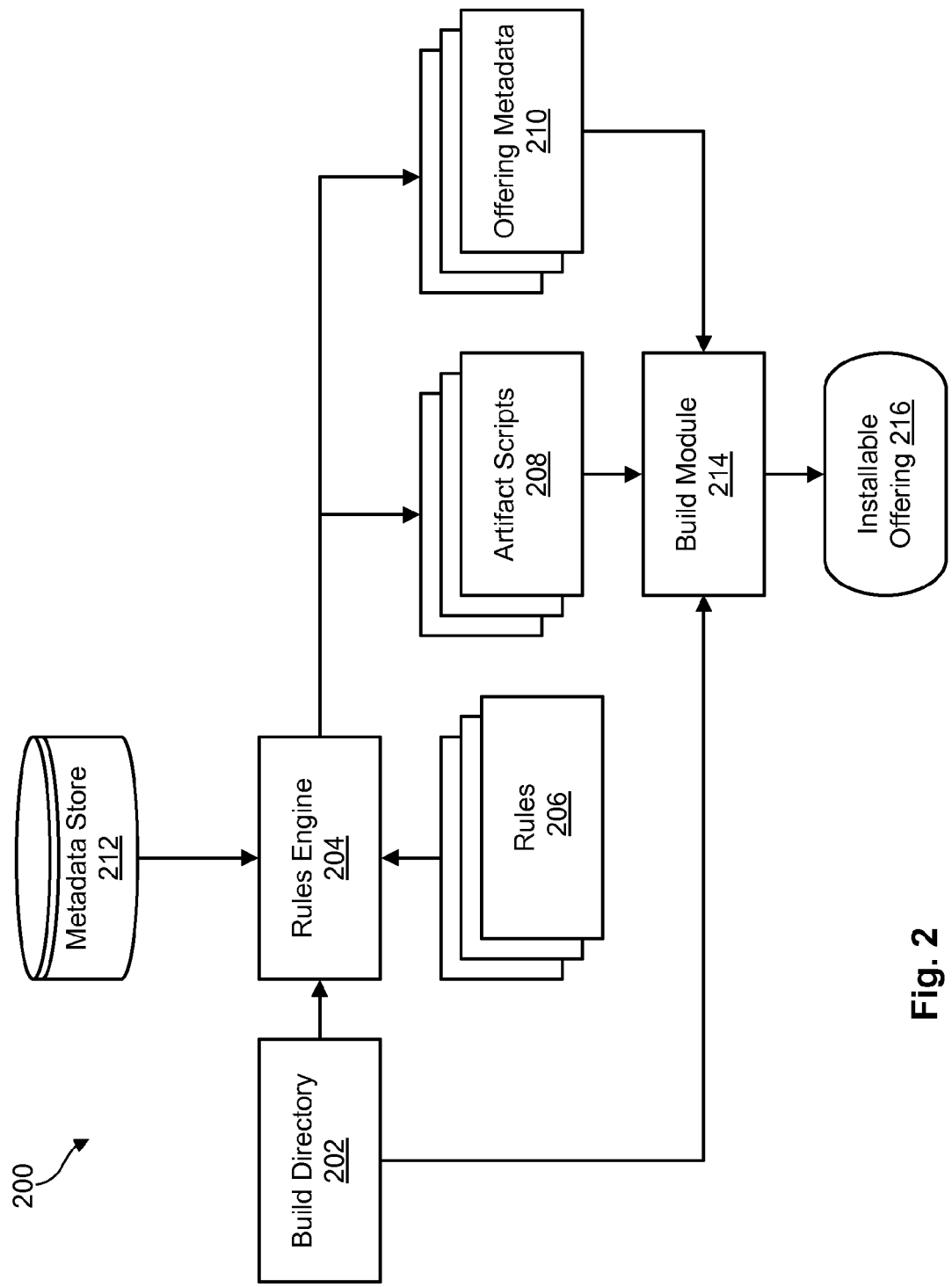
FIG. 2 is high-level block diagram of modules and data structures for generating an installable application.

Referring to FIG. 2, an application is typically written in a source code, such as some variant of the C programming language or some other compiled language. This source code is then compiled to generate application objects each including code executable by a target operating system. The result of the compiling of application source code results in a build directory structure of application objects and may include temporary or intermediate files generated as a result of the compilation process, such as a result of a preprocessing step. The original source code may also be present in the build directory. The build directory may be considered to be a staging ground for the packaging and other processing necessary to generate an installation repository that may be consumed by an installation manager in order to install an application on a target computer system.

Accordingly, a build environment 200 may include a build directory 202 that is processed according to methods described herein. The build environment 200 may be implemented by a single computer system 100 or by multiple computer systems 100. Likewise, functionality attributed to one component or module in the build environment 200 may be implemented by one or more computer systems 100.

The build directory 202 may be analyzed by a rules engine 204 that evaluates the build directory 202 in accordance with rules 206. The rules 206 may be default rules and may also be defined or modified by an application developer. The rules engine 204 may output artifact scripts 208 defining artifacts and containing code that, when executed, generates artifacts including application objects from the build directory 202 and corresponding metadata for instructing an installation manager on how to process the artifact upon installation. Alternatively, the rules engine 204 may define artifacts and also perform processing to generate artifacts and corresponding metadata directly rather than through a script. The artifacts as defined by the rules engine 204 may also be referenced in offering metadata 210. The offering metadata 210 may include developer-defined metadata retrieved from a metadata store 212. The rules engine 204 may also be programmed or otherwise configured to collect metadata for defining an artifact by analyzing the build directory 202. For example, the rules engine may gather metadata regarding objects in an artifact including an object size, type of object, hash value of the content of the object, location of the object in the build directory tree, and other like information. This collected data may be operated upon by the rules engine 204 when dividing application objects into artifacts and other units of an installation.

The metadata from the metadata store 212 may include such information as a target operating system, administrative privilege requirements, disk space requirements, language, configuration parameters, default values, environmental parameters for a host system, instructions to be performed on installation (e.g., instructions on where to copy installation files), and other like information as known in the art of application installation management. Alternatively, some or all of this metadata may be generated by the rules engine 204. The rules engine 204 may generate offering metadata 210 including some or all of the above referenced information as well as metadata for artifacts defined by the rules engine. An artifact and metadata corresponding thereto may be referred to as an installable unit (IU). The offering metadata 210 may also define relationships between IUs, group IUs into sharable units (SUs), or group SUs into assemblies or other SUs.

The artifact scripts 208, offering metadata 210, and corresponding files from the build directory 202 may be processed by a build module 214 to generate an installable offering 216 or installation repository 216 containing files suitable for consumption by an installation manager executing on a target system.

Figure 3:
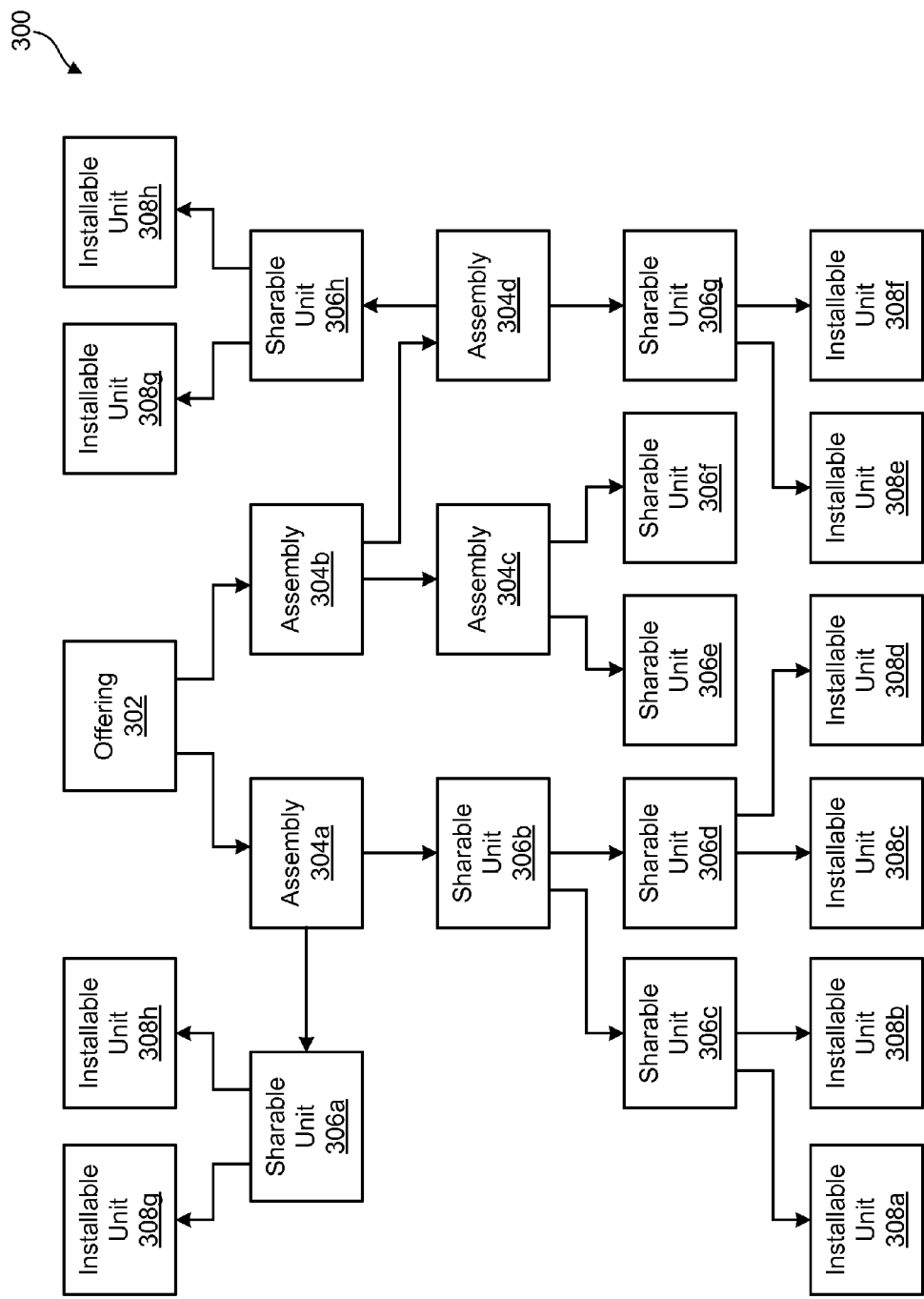
FIG. 3 is a block diagram of a hierarchy of units in an installable application.

Referring to FIG. 3, in certain embodiments, an installable application may be organized into an application hierarchy 300. The hierarchy 300 includes an offering 302 defining high level metadata and referencing one or more assemblies 304*a*, 304*b*, which in turn reference either one or more sharable units 306*a*, 306*b* or one or more assemblies 304*c*, 304*d*. A sharable unit 306*a*, 306*b* may also reference one or more other sharable units 306*c*, 306*d*. The assemblies 304*c*, 304*d* may likewise reference one or more sharable units 306*e*-306*h* or other assemblies. A sharable unit 306*a*-306*h* may also reference one or more installable units 308*a*-308*h* as shown. An installable unit 308*a*-308*h* is an atomic component including an artifact for one or more application objects and corresponding metadata.

Figure 4:
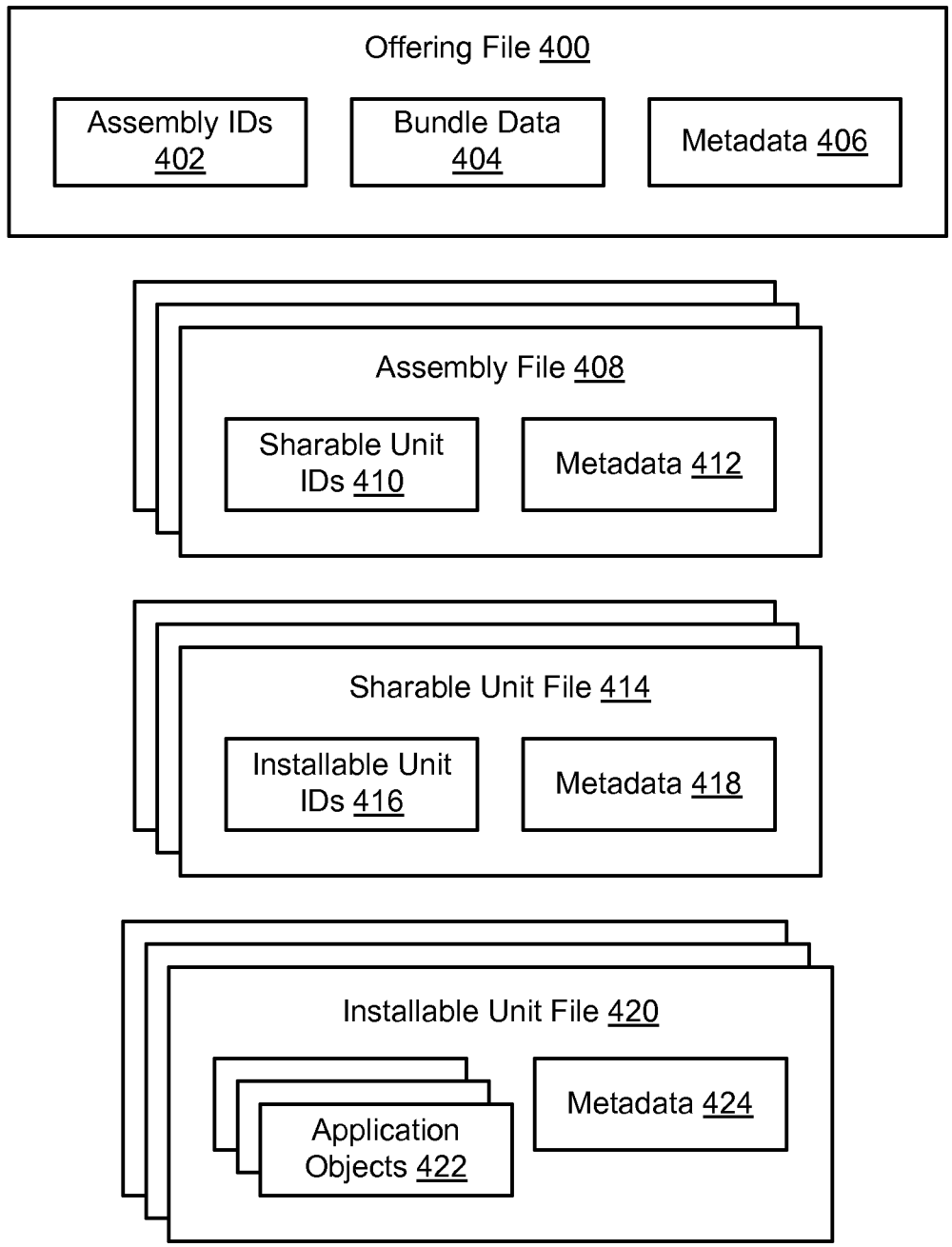
FIG. 4 is a block diagram of units included in an installable application.

Referring to FIG. 4, a hierarchy as shown in FIG. 3 may be implemented as shown. For example, an offering file 400, e.g. a ".off" file, may include assembly identifiers 402 referring to assembly (".asy") files or otherwise identifying one or more assemblies. An offering file 400 may additionally include bundle data 404. Bundle data 404 may include resources used by the application other than executable code such as images, video, audio, and text. In particular, bundle data 404 may include text for a particular target language. The use of bundle data 404 is particularly helpful for applications that are to be implemented in various human languages.

The offering file 400 may additionally include other offering metadata 406. The metadata 406 may include any metadata known in the art of application installation or installation management. For example, the metadata 406 may include a target operating system, administrative privilege requirements, disk space requirements, language information, configuration parameters, environmental parameters for a host system, dependencies on other applications, required system resources, user selectable options and corresponding configuration parameters, and like information that can be interpreted by an installation manager when installing an application.

An assembly file 408 may include identifiers 410 for one or more SUs as well as additional metadata 412. Metadata 412 may include some or all of the same metadata that may be included in the offering metadata 406. Metadata 412 may additionally describe relationships and dependencies among SUs or IUs corresponding to the assembly file 408 or to another assembly and its corresponding SUs or IUs.

An SU file 414 may include IU identifiers 416 for one or more installable units associated therewith as well as any other metadata 418 for the SU. As for the assembly file, the metadata 418 may include information defining relationships and dependencies among the IUs associated with the SU file 414 or to another SU or assembly. The metadata 418 may also include some or all of the metadata noted above with respect to the offering metadata 406.

An IU file 420 may include or reference one or more application objects 422 and include IU metadata 424. The metadata 424 may include some or all of the information noted above with respect to the offering metadata 406. The metadata 424 may also include information describing relationships, dependencies, or other information for the application objects 422, or the objects 422 of another IU, SU, or assembly.

Figure 5:
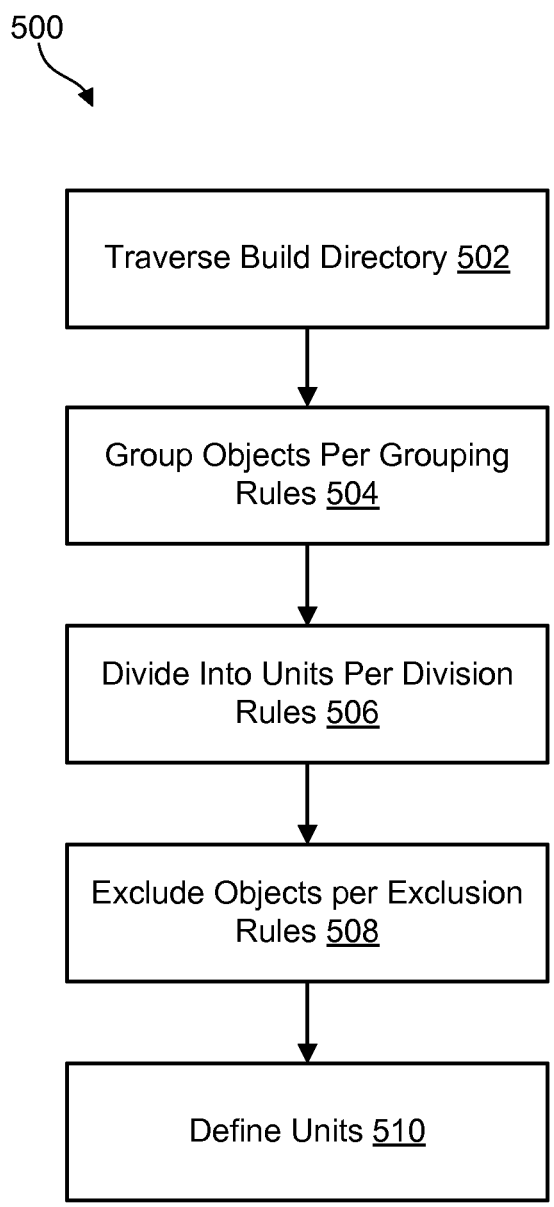
FIG. 5 is a process flow diagram of a method for generating artifacts from a build directory according to artifact generation rules.

FIG. 5 illustrates a method 500 for dividing application objects into artifacts according to artifact generation rules, such as the rules 206 of FIG. 2. The method 500 may include traversing 502 or otherwise evaluating a build directory 202. This may include traversing 502 the directory from a root directory down through sub directories or in an opposite direction.

As the directory is traversed 502 or otherwise evaluated, application objects that are encountered may be grouped 504 together according to an evaluation of artifact generation rules for grouping application objects and the structure of the directory. Grouping rules may require that application objects included in a group share a common attribute. Application objects that have been grouped 504 together may be divided 506 into units according to division rules. Certain application objects may also be excluded 508 from groups or from any group according to exclusion rules. Application objects that are excluded 508 may be excluded from the installation repository altogether or simply constrained to be the only application object associated with an artifact. The groups defined according to the grouping, division, and exclusion rules may then be used to define 510 individual units, including one or more of artifacts, IUs, SUs, and assemblies.

The steps 504-508 may be performed in any order and may be performed in accordance with a specified developer preference. For example, application objects that are to be excluded 508 altogether may be excluded prior to the grouping and division steps 504, 506. Likewise, one or more of the steps 504-508 may be excluded if a corresponding rule has not been specified. For example, where no exclusion rule has been specified, the exclusion step 508 may be omitted. The steps 504-508 may also be performed repeatedly or recursively for different levels of the build directory 202.

Figure 6:
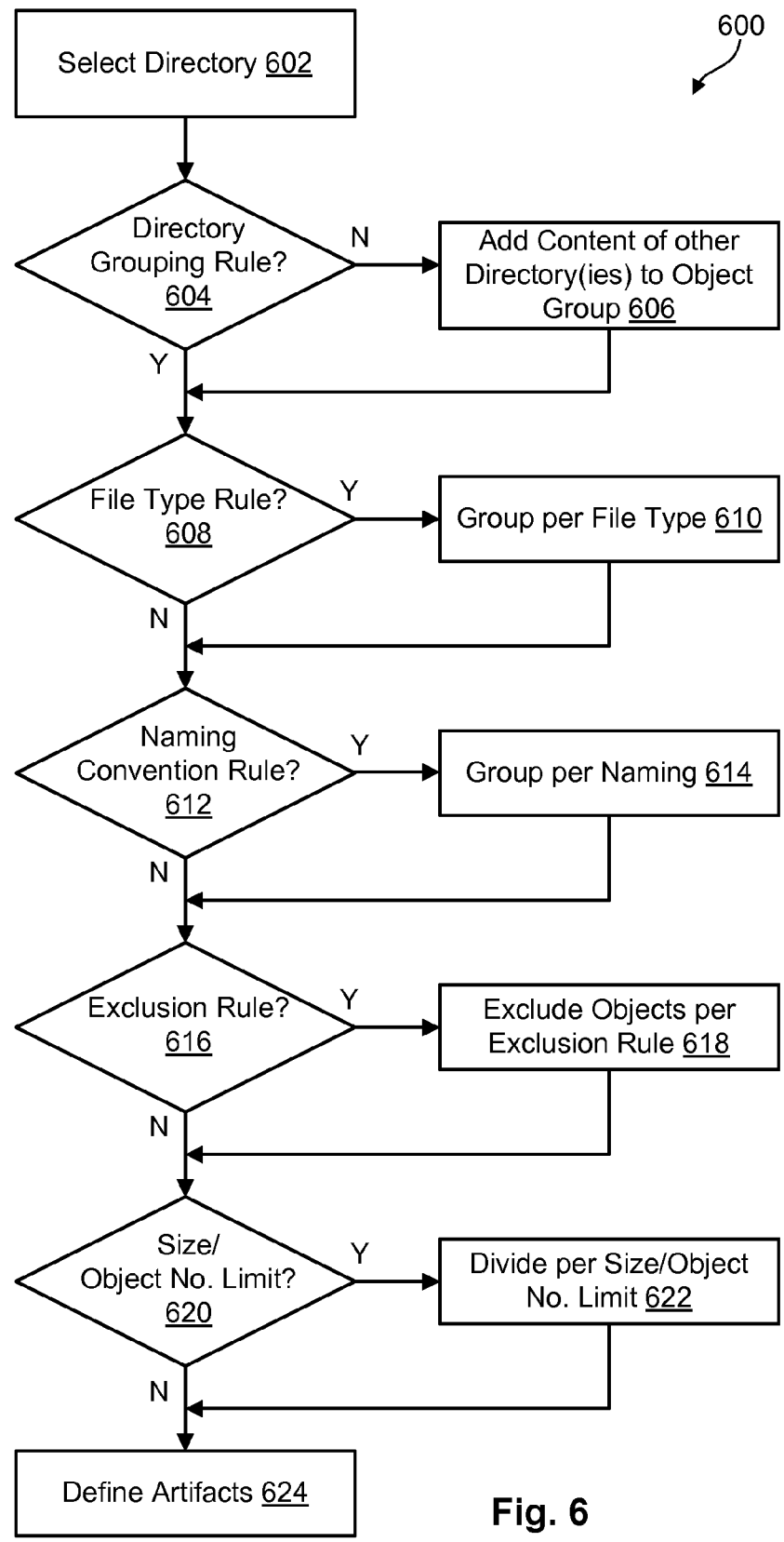
FIG. 6 is a process flow diagram of a method for applying artifact generation rules to application objects.

FIG. 6 illustrates a method 600 that may be used to perform one or more of grouping 504, dividing 506, and excluding 508 of application objects. The method 600 may include selecting 602 a directory from the build directory and identifying files contained in the selected directory. If the artifact generation rules are not found 604 to include a directory-grouping rule, then contents from one or more other directories may be added 606 to a group of objects in the directory that are to be subdivided into artifacts. The other directories may be on the same hierarchical level, a higher level, or a lower level in the build directory 202. In some embodiments, where no directory rule is determined 604 to be specified, an artifact may be generated for each application object in a directory.

If a directory grouping rule is found 604 to be specified, this may indicate that an artifact should contain only application objects sharing a common directory. Various versions of a directory-grouping rule may be specified. For example, application objects that are in a directory or a subdirectory of the directory may be deemed to have a common directory. In another embodiment, only application objects actually included in the same directory are deemed to have a common directory.

The method 600 may include evaluating 608 whether a file type rule has been specified. If so, then a group of applications objects being analyzed, such as a group of application objects defined according to another rule evaluated according to the method 600, may be grouped 610 according to file type such that each group includes only application objects of a selected file type. In certain embodiments, the file type of an application object may be determined by examining a file name extension (e.g., .exe for windows, .sh for Unix derivatives). A file type rule may advantageously enable isolation of files corresponding to particular operating systems. Accordingly, to build an application for a different operating system, only artifacts with operating-system-specific files need be replaced.

The method 600 may further include evaluating 612 whether a naming convention rule has been specified. If so, then a list of application objects being analyzed, such as a group of application objects defined according to another rule evaluated according to the method 600, may be further grouped 614 according to a naming convention. This may include subdividing 614 a group of application objects into subgroups of application objects that have a common naming convention. The naming convention(s) defining each group may be specified as a search string, regular expression, or other textual description used to determine whether a file name for an application object corresponds to the naming convention.

The method 600 may further include evaluating 616 whether any exclusion rules have been specified. If so, files to be excluded according to exclusion rules may be removed from a group of application objects, such as a group of application objects defined according to any of the other grouping rules discussed herein. As already noted, an exclusion rule may specify that an application object should be excluded from an installation repository altogether or specify that an application object having a certain attribute should be the only application object in an artifact.

For example, a build directory may include source code and temporary files generated during compilation in addition to actual compiled object code. Accordingly, an exclusion rule may specify that these files should not be included in an installation repository. In some embodiments, an internal installation build may include source files but exclude temporary files or other compiler byproducts other than executable code. In another example, an artifact containing a single file of an archival type such as .zip, .jar, .tar, may be generated for each of such files and such files may be excluded from other groups.

The method 600 may also include evaluating 620 whether one or both of a file number rule and size limit rule have been specified. If so, then a group of application objects, such as defined according to any of the rules described herein, may be divided 622 according to one or more file size and file number rules. For example, the sum of the sizes of application objects in a group may be constrained to be less than a threshold value. Likewise the number of files included in an artifact may be constrained to be less than a threshold number. Accordingly, a group of application objects, such as defined according to another rule, may be divided into subgroups such that each subgroup has a total size less than a threshold. A group of application objects may also be divided into subgroups such that the number of application objects in each subgroup is less than a threshold number. The order a size limit rule and a file number rule are applied may also vary. Likewise, both constraints may be used to determine subgroups of a group of application objects that satisfy both size and file number limits.

Rules for limiting the size or file number for an artifact may advantageously provide granularity control. That is to say that increasing the number of files or size of an artifact can be used to reduce the number of artifacts. Likewise, reducing the number of files in an artifact enables one to update an installation by simply replacing a small artifact. In either case, the installation may be tuned according to developer preference.

Other artifact grouping rules may also be defined as defaults or according to developer preference. Further grouping, dividing, and exclusion steps may also be performed in accordance with the method 600 according to these rules.

Groups of application objects as grouped and subgrouped according to the rules described hereinabove may then be used to define 624 artifacts having one of the groups of application objects associated therewith. These artifact definitions may then be used to generate metadata and installable units (IU) for inclusion in an installation repository.

The method 600 may additionally be used to generate groupings of artifacts and their corresponding IUs into sharable units (SUs) and assemblies. For example, artifacts having corresponding application objects with a common directory or common parent directory may be grouped 606 together according to a directory rule. Likewise, artifacts that have corresponding application objects with a common file type may be grouped 610 together according to a file type rule. Artifacts with application objects following a common naming convention may be grouped 614 together according to a naming convention rule. The number of artifacts and the sum of the sizes of artifacts grouped according to any of the steps of the method 600 may likewise follow one or both of a file number and size rule. In some embodiments, a set of rules for grouping artifacts into SUs may also be specified either as default rules or according to a developer preference. In some embodiments, SU generation rules may be inferred from artifact generation rules. One or more SUs may then be defined 624 according to the grouping and division steps discussed above. This may include generating corresponding metadata referencing the artifacts assigned to each SU.

In a like manner, SUs may be grouped into assemblies according to a method 600. For example, SUs having corresponding artifacts with application objects located in a common directory or below a common parent directory may be grouped 606 together according to a directory rule. Likewise, SUs that have corresponding application objects with a common file type may be grouped 610 together according to a file type rule. SUs with corresponding application objects following a common naming convention may be grouped 614 together according to a naming convention rule. The number of SUs and the sum of the sizes of SUs grouped according to any of the steps of the method 600 may likewise follow one or both of a file number and size rule. In some embodiments, a set of rules for grouping SUs may also be specified either as default rules or according to a developer preference. In some embodiments, assembly generation rules may be inferred from one or both of SU generation rules and artifact generation rules. One or more assemblies may then be defined 624 according to the grouping and division steps applied to the SUs as discussed above. This may include generating corresponding metadata referencing the SUs assigned to each assembly according to the grouping and division steps of the method 600.

FIG. 7 illustrates a method 700 for generating an offering including defining 702 artifacts for inclusion in an IU. This may include dividing application objects of a build directory into artifacts according to the methods disclosed herein, such as using the method 600.

The method 700 further includes defining 704 SUs for groups of IUs and defining 706 assemblies for groups of SUs. IUs may be grouped into SUs and SUs grouped into assemblies according to any and all of the methods disclosed herein, such as using the method 600 as adapted for defining SUs or assemblies. In addition, the artifact definition step 702 may be performed according to the methods disclosed herein.

Metadata corresponding to any IUs, SUs, and assemblies defined according to steps 702, 704, and 706 may be generated 708. Generating 708 metadata for an IU may include generating metadata and otherwise packaging the artifact corresponding to the IU. The metadata may include any and all of the metadata discussed herein as suitable for inclusion in an IU. Generating 708 metadata for an SU or assembly may include storing information identifying the IU and SU, respectively, associated with the SU or assembly and including any other metadata in the SU or assembly, including any or all of the metadata described hereinabove as appropriate for inclusion in an SU or assembly.

References to the assemblies may then be added 710 to developer-defined offering metadata. This may include adding 710 a disk space requirement according to the size of the assemblies and corresponding application objects to the offering metadata. Other metadata describing the assemblies may also be added 710 to the offering metadata such as information describing system requirements, configuration parameters, relationships between assemblies, and other information as known in the art of installation repository generation.

FIG. 8 illustrates a method 800 for generating metadata for some or all of an IU, SU, or assembly. The method 800 may include generating 802 a unit definition for a given unit type (IU, SU, or assembly), such as according to the methods described above for defining an artifact, SU, or assembly according to a build directory and artifact generation rules. A template and a style sheet corresponding to the unit type (IU, SU, or assembly) may be retrieved 804. The template may be a document describing default parameter values and other information used to specify a given unit type. In some embodiments, the template is embodied as an extensible markup language (XML) document. A style sheet may define formatting and other syntactical requirements to generate a script or metadata for a given unit type. The style sheet may define transformations to be applied to the template to achieve metadata having the proper parameters and formatting for use by an installation manager. In some embodiments, the style sheet is also embodied as an XML document, such as an XSLT (Extensible Style Sheet Language Transformation) style sheet.

The template may then be transformed 806 according to the style sheet and a definition for the unit. The definition may include the sub-units to be included in the unit. For example, the definition for an IU may identify an artifact or a group of application objects. Likewise, the definition for an SU or assembly may include a group of IUs or SUs, respectively, associated with the SU or assembly. The template is therefore transformed 806 according to the style sheet and unit definition to output 808 a metadata file or script for generating a metadata file. In particular, in the case of an IU, a script for packaging the application objects of the corresponding artifact and generating corresponding metadata may be output. The script may then be subsequently executed to generate the actual IU. In one exemplary embodiment, the script may be an Apache ANT (Another Neat Tool) script, although other scripting languages may also be used.

Figure 9:
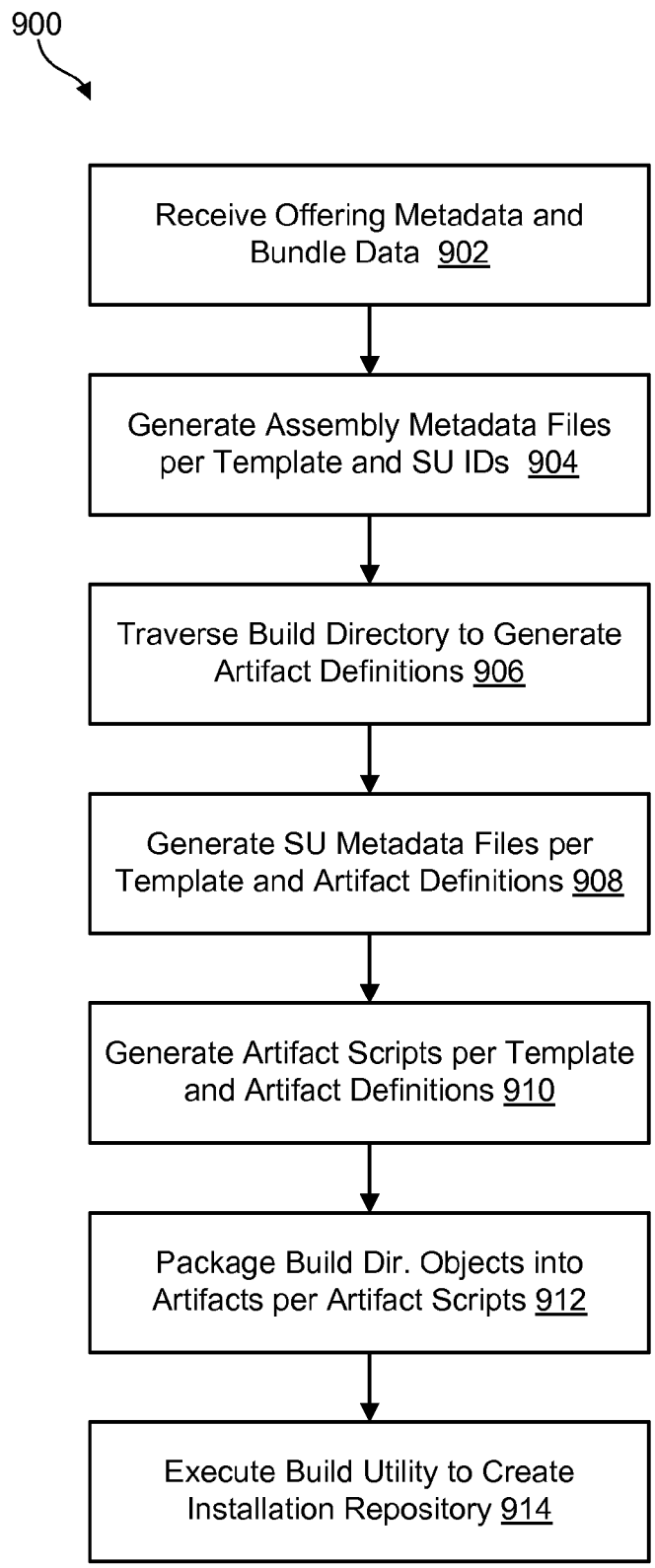
FIG. 9 is a process flow diagram of a method for generating an installable application.

FIG. 9 illustrates an example method 900 for generating an installation repository using one or more IUs, SUs, and assemblies generated or otherwise defined according to the methods described hereinabove. The method 900 may include receiving 902 offering metadata and bundle data for an offering. As noted above, the offering metadata is typically developer specified and may include global parameters, configuration values, system requirements or instructions, administrative privilege requirements, licensing definitions or restrictions, user definable parameters, and other like information. The bundle data may include images, video, audio, text, and other information to facilitate application operation as discussed hereinabove.

Assembly metadata files may be generated 904 according to templates and identifiers of SUs to be included in each assembly. This may include performing a template transformation according to the method 800 as described hereinabove. The groupings of SUs for an assembly may be developer defined or inferred from a build directory. The grouping of SUs into assemblies may be performed before or after the actual IU of an SU are defined and associated therewith. In such embodiments, defining an IU may additionally include associating the IU with a preexisting SU.

A build directory may be traversed 906 to generate artifact definitions by generating groups of application objects or artifacts including a single application object. Traversing 906 may include applying artifact generation rules according to default rules or rules specified by a developer according to methods disclosed herein, such as the method 600.

SU metadata may then be generated 908 for each SU to associate each of the artifacts with the SU. Generating 908 metadata may include performing a template transformation using a style sheet and the identifiers of the artifacts according to the method 800 or performing some other method to generate the appropriate metadata for an SU.

Artifact scripts may then be generated 910. The artifact scripts may define how to transform a grouping of application objects associated with each artifact into an IU with appropriate metadata. Generating 910 artifact scripts may include performing a template transformation according to a style sheet and an artifact definition as described above with respect to the method 800. Other methods for generating a script for creating an artifact and an IU with appropriate metadata may also be used. The artifact scripts may then be executed to package 912 application objects from the build directory into artifacts.

A build utility 914, such as known in the art, may be executed 914 to create an installation repository including the offering, assembly, SU, IU, and corresponding artifacts as generated according to the foregoing steps. An installation manager may then consume the installation repository in order to install the application on a target system as known in the art of installation management.

Figure 10:
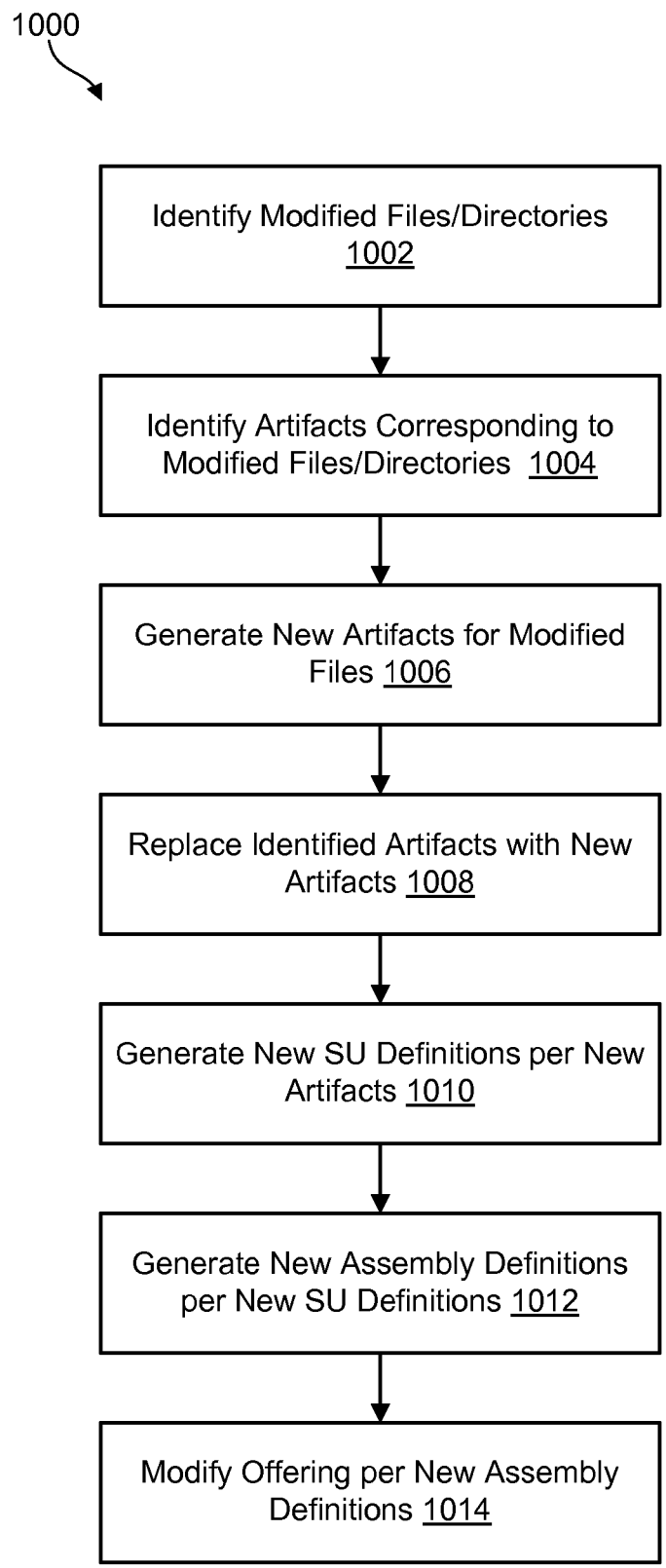
FIG. 10 is a process flow diagram of a method for incrementally updating an installable application according to modification of corresponding application objects.

FIG. 10 illustrates a method 1000 for updating an installation repository according to modifications of files in a build directory. As noted above, a large installation may have many thousands of files and the process of generating an installation repository can be a time consuming process. Accordingly, the method 1000 may be used to reduce the time required to generate a fix package or updated installation repository by generating a "delta build" reflecting modifications to the build directory.

The method 1000 may include identifying 1002 modified files or directories in a build directory. Identifying 1002 modified files may include comparing a time stamp of files and directories in the build directory to a time of the most recent complete build of the installation repository. Modified files may also be identified 1002 by analyzing changes to file size, hash value, file content, location within the build directory tree, or changes to other data defining a file or relating to a file. Artifacts corresponding to the modified files or directories may then be identified 1004. As noted above, an artifact is a group of application objects from a build directory. Accordingly, the definition of artifacts may be evaluated to identify 1004 artifacts that include an application object that has been modified or deleted in a build directory. The application objects corresponding to the identified artifacts may then be processed according to the methods described above, including using the artifact generation rules, to generate 1006 one or more new artifacts. The identified artifacts may then be removed and replaced 1008 with the newly generated artifacts.

In some embodiments, more or fewer artifacts may be generated as a result of the modification of application objects in a build directory or modification of the build directory itself. Accordingly, the artifacts for the application, including the newly generated artifacts, may be evaluated according to methods disclosed herein to perform one or more of generating 1010 new SU definitions, generating 2012 new assembly definitions according to the new SU definitions, and modifying 1014 an offering according to the new assembly definitions.

In some embodiments, a fix package including less than all of the application components may be generated for transmission to existing systems having the application installed thereon. In such embodiments, the new artifacts and modified metadata such as one or more of new IU, SU, assembly, and offering files may be packaged and transmitted or fixed to a tangible medium for installation over an existing application installation.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for application building, the method comprising:

evaluating a build directory comprising a plurality of application objects in a hierarchical directory structure;

evaluating artifact generation rules with respect to the plurality of application objects and the hierarchical directory structure;

traversing the hierarchical directory structure and defining object groupings based on locations of objects within the hierarchical directory structure, each object grouping comprising one or more application objects of the plurality of application objects, and each object grouping defined according to the evaluations of the artifact generation rules and the hierarchical directory structure;

generating artifacts according to the object groupings, and metadata for each object grouping, wherein the metadata includes at least one of configuration parameters, disk space requirements, and application object identifiers for the application objects of the object groupings; and generating an installable application including the generated artifacts.

2. The method of claim 1, further comprising defining one or more artifact groupings according to at least one of the evaluation of the build directory and the evaluation of the artifact generation rules; and defining sharable units according to the artifact groupings;

wherein generating the installable application including the generated artifacts further comprises including the defined sharable units in the installable application.

3. The method of claim 2, further comprising defining one or more sharable unit groupings according to at least one of the evaluation of the build directory and the evaluation of the artifact generation rules; and defining at least one assembly according to the sharable unit groupings;

wherein generating the installable application including the generated artifacts further comprises including the defined at least one assembly in the installable application.

4. The method of claim 1, wherein generating artifacts according to the object groupings further comprises, for each object grouping:

retrieving a script template and a style sheet;

transforming the template into an artifact script according to the style sheet and object grouping; and executing the artifact script on the application objects of the object grouping to generate an artifact.

5. The method of claim 1, wherein the artifact generation rules include at least one rule requiring an object grouping to include only application objects having a common attribute.

6. The method of claim 5, wherein the common attribute is selected from a group consisting of file type and naming convention.

7. The method of claim 1, wherein the artifact generation rules include at least one rule limiting at least one of a number of application objects includable in an object grouping and a total size of application objects included in an object grouping.

8. The method of claim 1, wherein the artifact generation rules include at least one rule requiring that application objects of a specified type be excluded from any object grouping.

9. The method of claim 1, wherein the artifact generation rules include at least one rule requiring that object groupings include only application objects from a same directory in the build directory.

* * * * *